United States Patent
Chueh et al.

(10) Patent No.: US 8,464,079 B2
(45) Date of Patent: Jun. 11, 2013

(54) BATTERY LIFE EXTENDING POWER SUPPLY SYSTEM

(75) Inventors: Yung Fa Chueh, Hsichin (TW);
Chia-Fa Chang, Linkou Township, Taipei County (TW); Wen-Yung Chang, Chungli (TW)

(73) Assignee: Dell Products L.P., Round Rock, TX (US)

( * ) Notice: Subject to any disclaimer, the term of this patent is extended or adjusted under 35 U.S.C. 154(b) by 345 days.

(21) Appl. No.: 12/839,797

(22) Filed: Jul. 20, 2010

(65) Prior Publication Data

US 2012/0023339 A1 Jan. 26, 2012

(51) Int. Cl.
| | |
|---|---|
| G06F 1/00 | (2006.01) |
| G06F 1/26 | (2006.01) |
| H02J 7/00 | (2006.01) |
| G05F 5/00 | (2006.01) |
| B23K 11/24 | (2006.01) |
| H02M 7/34 | (2006.01) |
| H04M 1/00 | (2006.01) |

(52) U.S. Cl.
USPC ........... 713/300; 713/320; 320/107; 320/127; 320/137; 323/299; 323/318; 363/108; 455/572

(58) Field of Classification Search
USPC ... 713/300, 320; 320/107, 127, 137; 323/299; 323/318; 363/108, 299, 318; 455/572
See application file for complete search history.

(56) References Cited

U.S. PATENT DOCUMENTS

| | | | | |
|---|---|---|---|---|
| 5,982,146 | A * | 11/1999 | Nguyen | 320/131 |
| 6,657,415 | B2 * | 12/2003 | Saeki et al. | 320/125 |
| 6,895,516 | B2 * | 5/2005 | Odaohhara | 713/300 |
| 7,282,891 | B2 * | 10/2007 | Smallwood et al. | 320/137 |
| 7,612,536 | B2 * | 11/2009 | Hoffer et al. | 320/133 |
| 8,030,890 | B2 * | 10/2011 | Hyatt | 320/114 |
| 2008/0116854 | A1 * | 5/2008 | Park | 320/160 |

OTHER PUBLICATIONS

Chia-Fa Chang, Hua Chung, Ligong Wang and Yung Fa Chueh; "Systems and Methods for Monitoring and Characterizing Information Handling System Use Behavior;" U.S. Appl. No. 12/799,871, filed May 4, 2010, 29 Pages.

* cited by examiner

Primary Examiner — Stefan Stoynov
(74) Attorney, Agent, or Firm — Haynes and Boone, LLP

(57) ABSTRACT

A power supply system includes a battery and a power management system. The power management system is coupled to the battery and to an external power source that is operable to charge the battery using a first charge level. The power management system is operable to determine that a battery power level of the battery is greater than a first predetermined level that depends on a battery storage option and, in response, disable power from being supplied from the external power source such that power is supplied from the battery until the battery power level is below the first predetermined level. The power management system is also operable to determine that the battery power level of the battery is less than the first predetermined level and, in response, charge the battery with a second charge level that is less than the first charge level until the battery power level is above a second predetermined level that depends on the battery storage option.

20 Claims, 5 Drawing Sheets

BATTERY LIFE EXTENDING POWER SUPPLY SYSTEM

BACKGROUND

The present disclosure relates generally to information handling systems, and more particularly to battery life extending power supply system in an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, portable IHSs, include rechargeable battery packs that may be used along with non-mobile external power supplies (e.g., external AC power supplied through an AC adapter from an external power source) to supply power to the IHS. For example, when the user of the IHS does not require mobility, a non-mobile external power supply is coupled to the IHS to power the IHS. When the user of the IHS requires mobility, the non-mobile external power supply is decoupled from the IHS and the battery pack is used to power the IHS. Furthermore, when the non-mobile external power supply is coupled to the IHS, it is used to charge the battery pack in preparation for providing battery pack power to the IHS when the user requires mobility. This charging of the battery pack with the non-mobile external power supply can raise a number of issues.

For example, many users power their portable IHSs using non-mobile external power supplies for extended periods of time. During such extended times, the battery cells of the battery pack remain at a substantially fully charged status and elevated temperature. Permanent battery degradation occurs more rapidly in batteries that are kept in such a fully charged status and at elevated temperatures. Thus, users that power their portable IHSs using non-mobile external power supplies for extended periods of time accelerate the battery degradation in their battery packs and experience shorter battery pack lives relative to more mobile users. This can result in the need to replace battery packs more often, which leads to user dissatisfaction.

Accordingly, it would be desirable to provide an improved power supply system that results in extended battery life.

SUMMARY

According to one embodiment, a power supply system includes a battery and a power management system that is coupled to the battery and to an external power source that is operable to charge the battery using a first charge level, wherein the power management system is operable to: determine that a battery power level of the battery is greater than a first predetermined level that depends on a battery storage option and, in response, disable power from being supplied from the external power source such that power is supplied from the battery until the battery power level is below the first predetermined level, and determine that the battery power level of the battery is less than the first predetermined level and, in response, charge the battery with a second charge level that is less than the first charge level until the battery power level is above a second predetermined level that depends on the battery storage option.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
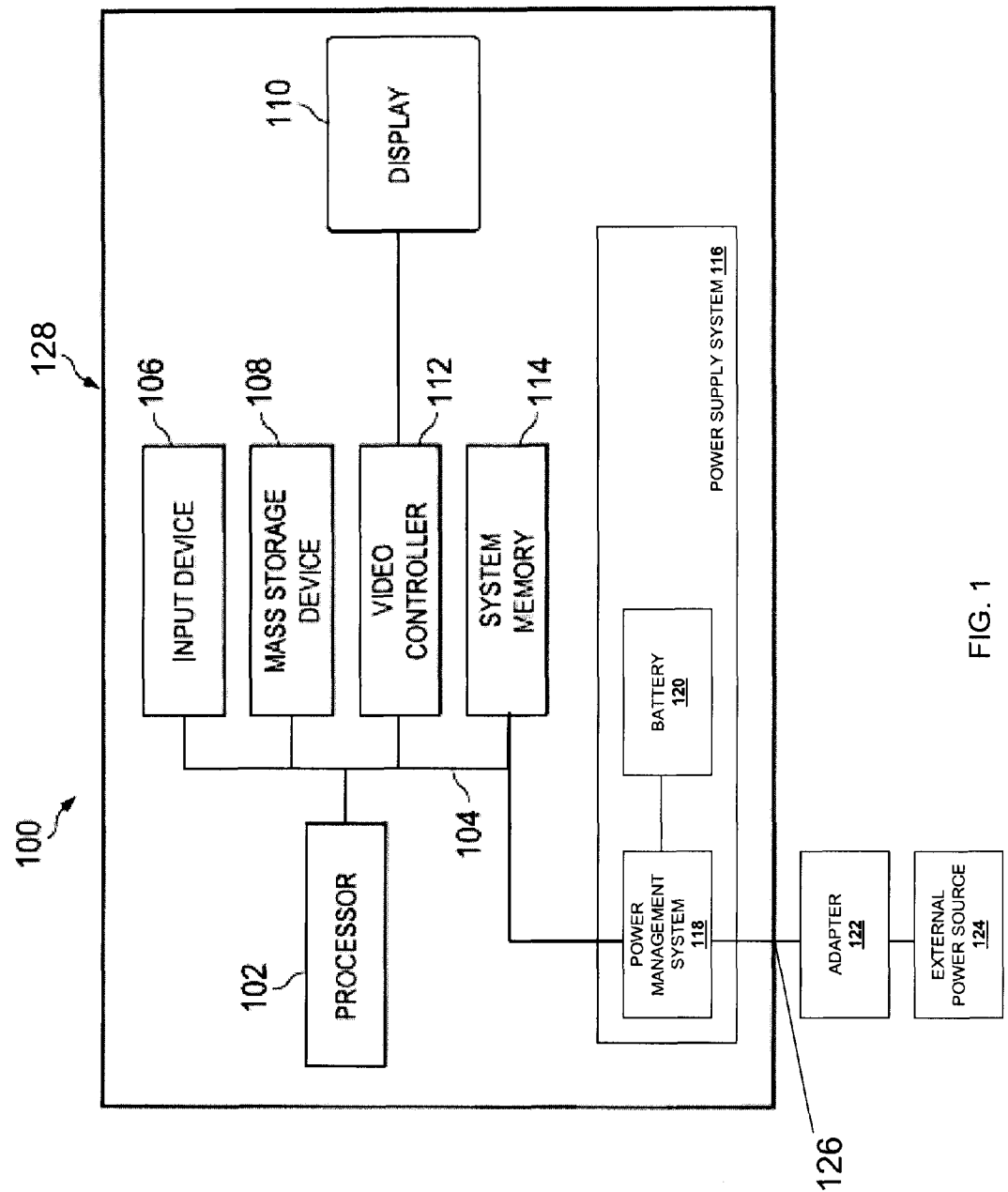
FIG. 1 is a schematic of an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. It should be understood that other buses and intermediate circuits can be deployed between the components described above and processor 102 to facilitate interconnection between the components and the processor 102. A power supply system 116 is coupled to some or all of the components of the IHS 100 in order to provide power to those components. In the illustrated embodiment, the power supply system 116 includes a power management system 118 that is coupled to a battery 120. In an embodiment, the battery 120 may include a battery pack made up of a plurality of batteries. In an embodiment, the battery 120 may include a variety of electrochemical batteries known in the art. However, one of skill in the art will recognize that other battery technologies may be used without departing from the scope of the present disclosure. An adapter 122 that is coupled to an external power source 124 is coupled to the power management system 118 through an external power source coupling 126. In an embodiment, the adapter 122 may be an AC/DC adapter known in the art that is operable to convert an alternating current (AC) from the external power source 124 to a direct current (DC). In an embodiment, the power supply system 116 may include other components such as, for example, a battery management unit (BMU) that is coupled to the battery 120. In an embodiment, a chassis 128 houses some or all of the components of IHS 100 and the power supply system 116. For example, the illustrated embodiment may be appropriate for a portable IHS, with the chassis 128 housing the IHS components and the power supply system 116, and including the external power source coupling 126 on a chassis surface such that the adapter 122 may be coupled to the external power source coupling 126 to couple the external power source 124 to the power management system 118. However, one of skill in the art will recognize that other configurations may be used without departing from the scope of the present disclosure.

Figure 2:
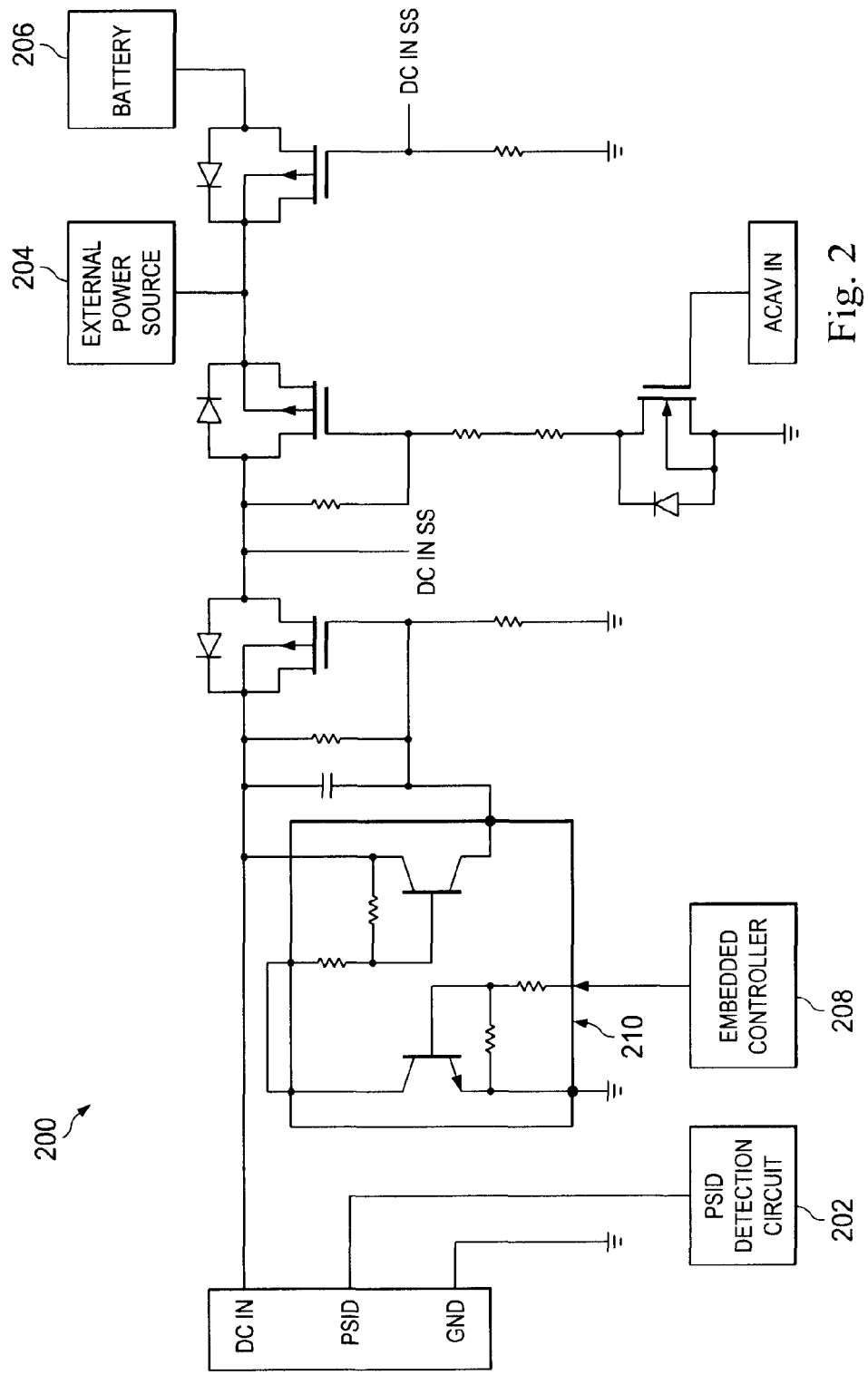
FIG. 2 is a schematic of an embodiment of a power management circuit used with the information handling system of FIG. 1.

Referring now to FIG. 2, an embodiment of a power management circuit 200 is illustrated. The power management circuit 200 may be included on a circuit board that is housed by the chassis 128, described above with reference to FIG. 1, and may be coupled to or included in the power management system 118. The power management circuit 200 includes a power supply detection and identification circuit 202 that is coupled to an external power source 204 and a battery 206, which may be the external power source 124 and the battery 120 described above with reference to FIG. 1. A controller 208 is coupled to the power supply detection and identification circuit 202, the external power source 204, and the battery 206 through a power source control circuit 210. The power management circuit 200 may also include metal oxide semiconductor field effect transistors (MOSFETs), resistors, capacitors, and a variety of other components known in the art, as illustrated in FIG. 2. However, one of skill in the art will recognize that the power management circuit 200 may be modified from the embodiment illustrated in FIG. 2 without departing from the scope of the present disclosure.

Figure 3:
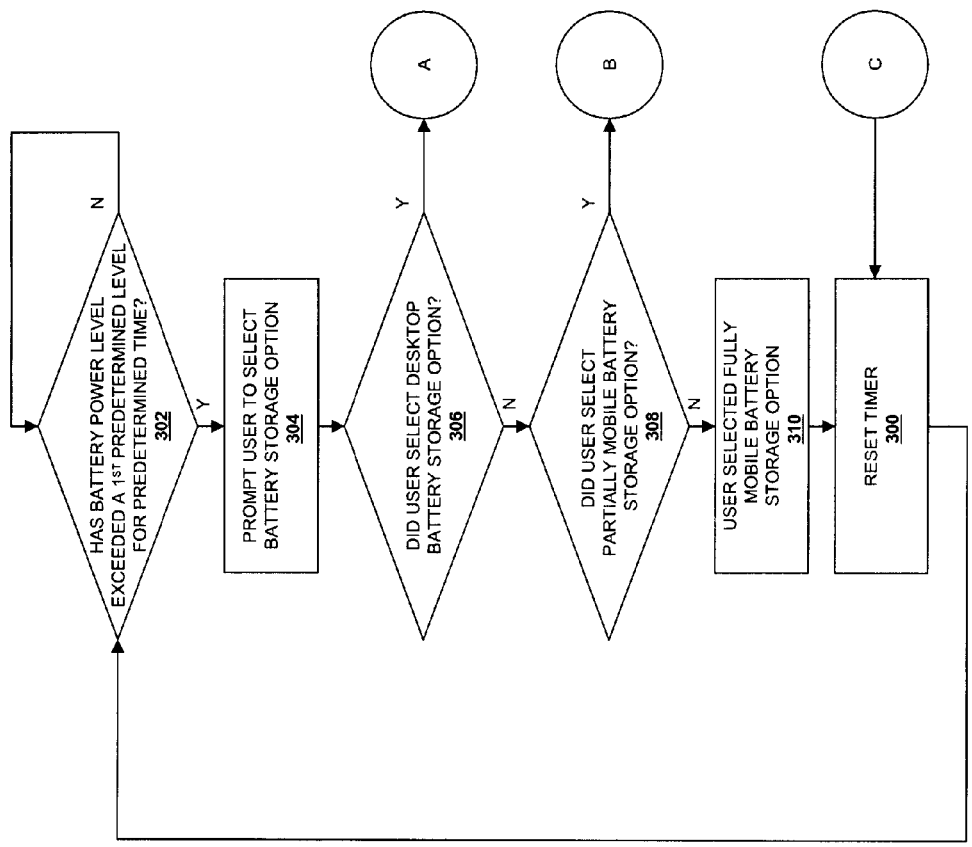
FIG. 3 is a flow chart of an embodiment of a method for managing power.
Figure 4:
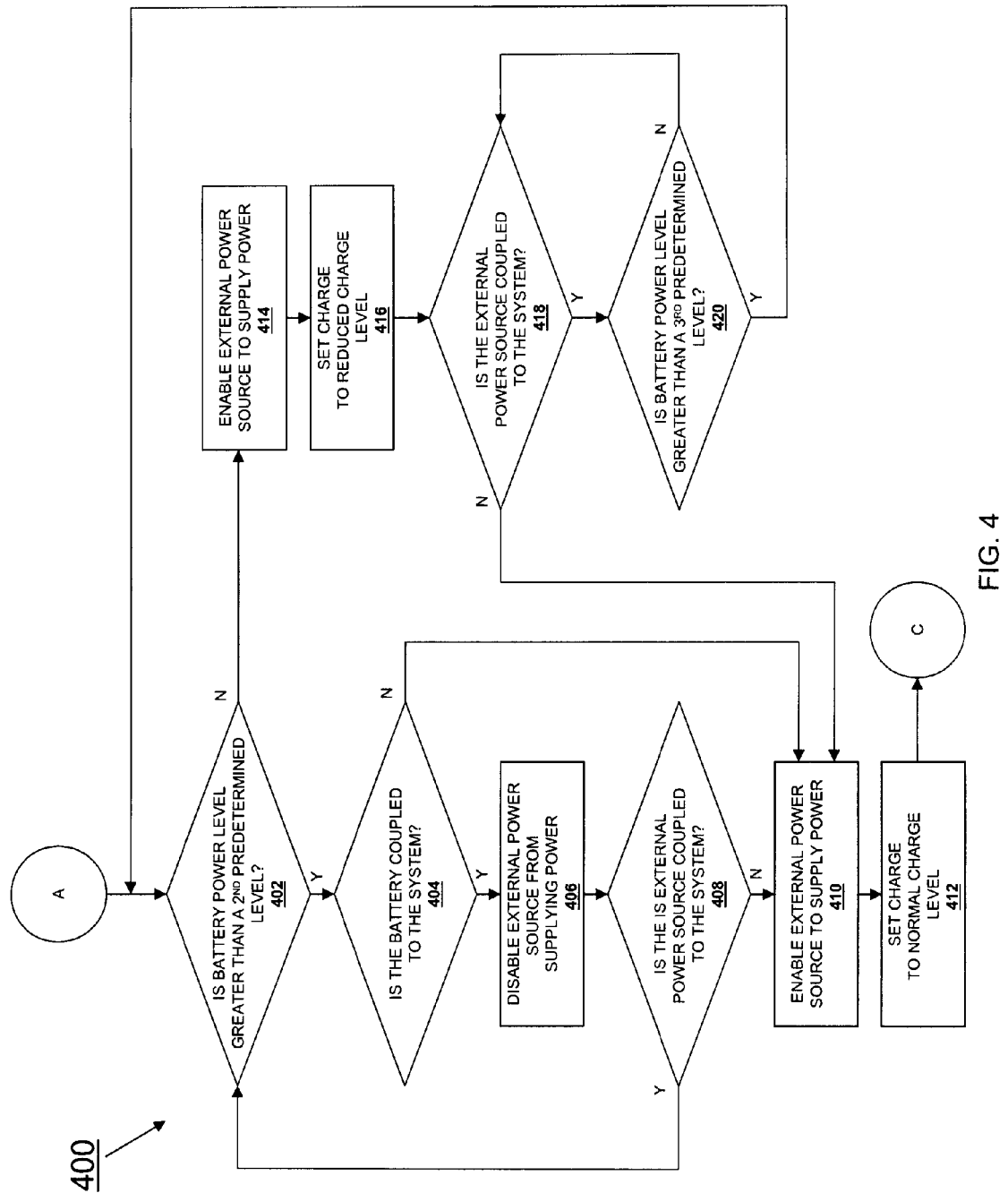
FIG. 4 is a flow chart of an embodiment of a method for providing a desktop battery storage option in the method of managing power of FIG. 3.
Figure 5:
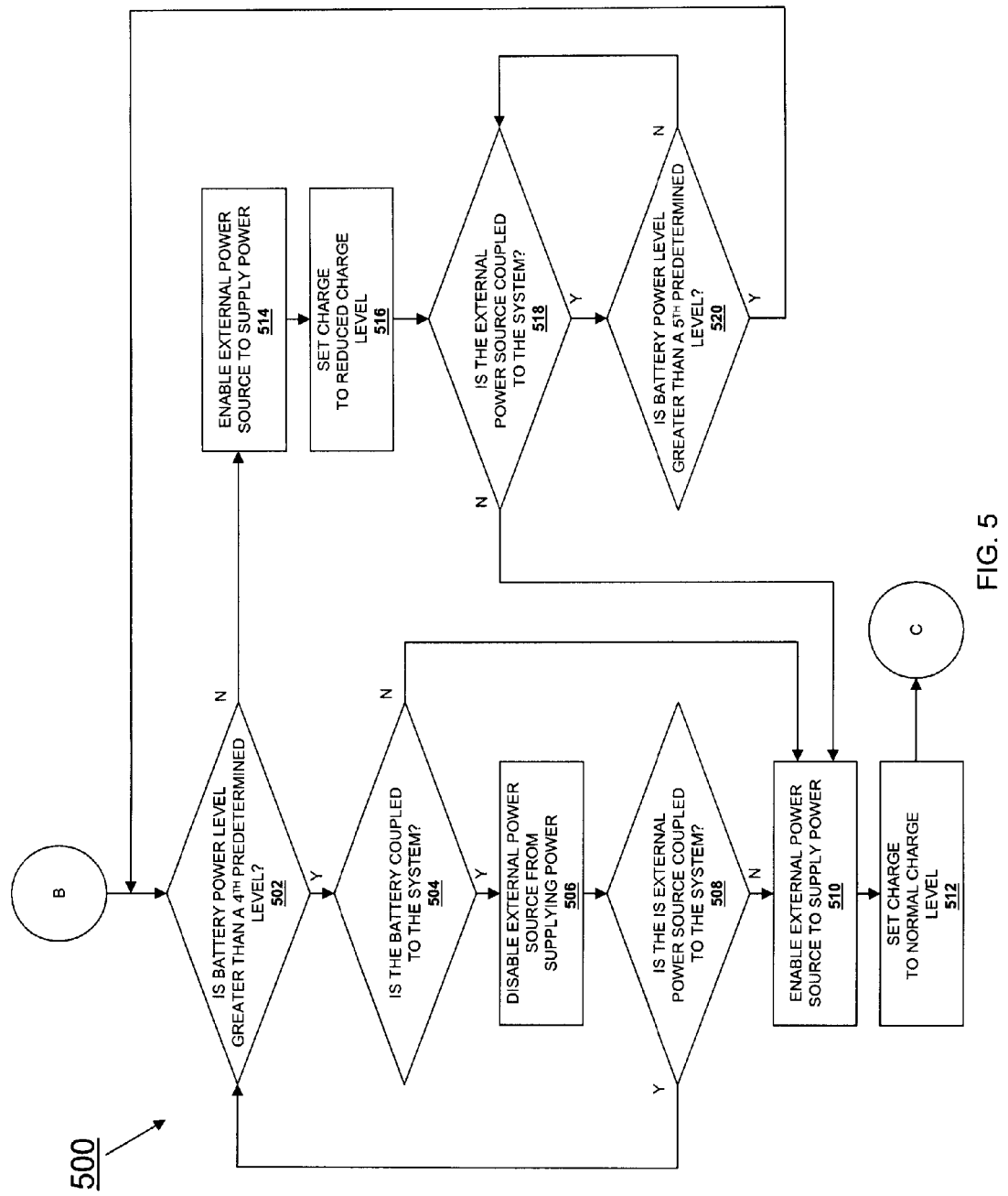
FIG. 5 is a flow chart of an embodiment of a method for providing a partially mobile battery storage option in the method of managing power of FIG. 3.

Referring now to FIGS. 1, 2, 3, 4, and 5, a plurality of methods 300, 400, and 500 for managing power are illustrated and will be described with reference to the IHS 100 and the power management circuit 200 described above. However, one of skill in the art will recognize that the methods 300, 400, and 500 may apply to systems and circuits that are modified relative to the IHS 100 and the power management circuit 200 without departing from the scope of the present disclosure. Referring initially to FIG. 3, the method 300 begins by determining a battery storage option. In an embodiment, the method 300 may begin at decision block 302 where it is determined whether a battery power level in the battery 120 has exceeded a first predetermined level for a predetermined time. In an embodiment, the battery power level may be the relative state of charge (RSOC) of the battery. The RSOC of a battery is a close approximation of the remaining capacity of the battery and may depend on a number of battery factors such as the age, the number of charge/discharge cycles, the voltage level, the current consumption, the temperature, and/or other factors known in the art. In an embodiment, the controller 208 may be programmed to determine whether the battery power level in the battery 120 has exceeded the first predetermined level for the predetermined time. For example, the controller 208 may determine whether the RSOC of the battery 120 has exceeded 93% (i.e., the first predetermined level) for over 3 days (i.e., the predetermined time.) If the battery power level in the battery 120 has not exceeded the first predetermined level for the predetermined time, the method 300 returns to decision block 302 to continue to check the battery power level in the battery 120 to determine if it has exceeded the first predetermined level for the predetermined time.

If, at decision block 302, the method 300 determines that the battery power level in the battery 120 has exceeded the first predetermined level for the predetermined time, the method 300 proceeds to block 304 where a user is prompted to select a battery storage option. In an embodiment, the user may be presented with a plurality of battery storage options, which will be explained in further detail below, that may include, for example, a desktop battery storage option for portable IHSs that are predominantly connected to an external power source, a partially mobile battery storage option for portable IHSs that typically use battery power for only relatively short periods of time, and a fully mobile storage option for portable IHSs that regularly use battery power for relatively significant periods of time. In an embodiment, the user may be presented the battery storage options, for example, through a graphical user interface (GUI) on the display 110 of the IHS 100. In an embodiment, the controller 208 may be programmed to help present the battery storage options to the user (e.g., codes and for the desktop battery storage option, the partially mobile battery storage option, and/or the fully mobile battery storage option may be included in the controller 208 to be sent to the BMU or other components of the system.) In an embodiment, the battery storage options may be presented to the user as a 'pop-up' window on the IHS 100 upon the method 300 determining in decision block 302 that the battery power level in the battery 120 has exceeded the first predetermined level for the predetermined time. In another embodiment, decision block 302 may be skipped, and the user of the IHS 100 may access controls in the IHS 100 to select the battery storage option. In another embodiment, the method 300 may automatically select the battery storage option (e.g., desktop battery storage option, the partially mobile battery storage option, or the fully mobile battery storage option) upon the battery power level in the battery 120 exceeding a specific predetermined level for a predetermined time, as will be described in further detail below. While only three battery storage options will be described, one of skill in the art will recognize that any number of battery storage options may be provided without departing from the scope of the present disclosure.

The method 300 then proceeds to decision block 306, where the method 300 determines whether the user selected the desktop battery storage option. If, at decision block 306, the method 300 determines that the user selected the desktop battery storage option, the method 300 proceeds to a method 400, illustrated in FIG. 4. In another embodiment, the method 300 may automatically proceed to the method 400 upon the battery power level in the battery 120 exceeding a predetermined level for a predetermined time. The method 400 begins at decision block 402 where the method 400 determines whether a battery power level in the battery 120 is greater than a second predetermined level. In an embodiment, the controller 208 may be programmed to determine whether the battery power level in the battery 120 is greater than the second predetermined level. For example, at decision block 402, the controller 208 may determine whether the RSOC of the battery 120 is greater than 50% (i.e., the second predetermined level).

If, at decision block 402, the method 400 determines that the battery power level in the battery 120 is greater than the second predetermined level, the method 400 proceeds to decision block 404 where the method 400 determines whether the battery 120 is coupled to the power management system 118. In an embodiment, the power supply detection and identification circuit 202 is operable to detect whether the battery 102 is coupled to the power management system 118. If, at decision block 404, the method 400 determines that the battery 120 is not coupled to the power management system 118, the method 400 proceeds to block 410 where the external power source 124 is enabled to supply power to the IHS 100. As will be described below, the method 400 may disable the external power source 124 from supplying power to the IHS 100 during the method 400, and the combination of decision block 404 and block 410 of the method 400 enable the external power source 124 to supply power through the power supply system 116 to the IHS 100 in the event the battery 120 is removed from the power supply system 116 during the method 400. In an embodiment, the power source control circuit 210 is operable to enable a DC power path from the external power source 124 and/or the adapter 122 such that power may be supplied to the IHS 100 from the external power source 124. In an embodiment, at block 410 of the method 400, a MOSFET in the power management circuit 200 may be turned on by the power source control circuit 210 in order to provide a DC power path between the IHS 100 and the external power source 124 and/or the adapter 122. In an embodiment, at block 410 of the method 400, charge voltage and current is read from the Electronically Erasable Programmable Read Only Memory (EEPROM) of the BMU. If, at decision block 404, the method 400 determines that the battery 120 is present in the power supply system 116, the method 400 proceeds to block 406 where the external power source 124 is disabled from supplying power to the IHS 100. In an embodiment, the power source control circuit 210 is operable to disable a DC power path from the external power source 124 and/or the adapter 122 such that power may not be supplied to the IHS 100 from the external power source 124, and power is then supplied to the IHS 100 from the battery 120. In an embodiment, a MOSFET in the power management circuit 200 may be turned off by the power source control circuit 210 to remove a DC power path between the IHS 100 and the external power source 124 and/or the adapter 122.

The method 400 then proceeds to decision block 408 where the method 400 determines whether the external power source 124 is coupled to the power management system 118. In an embodiment, the power supply detection and identification circuit 202 is operable to detect whether the external power source 124 is coupled to the power management system 118. If, at decision block 408, the method 400 determines that the external power source 124 is not coupled to the power management system 118 (e.g., the external power source 124 and/or adapter 122 have been decoupled from the external power source coupling 126 on the IHS 100), the method 400 proceeds to block 410 where the external power source 124 is enabled to supply power to the IHS 100. In an embodiment, the external power source control circuit 210 is operable to enable a DC power path (e.g., a DC power path between the external power source coupling 126 and one or more components of the IHS 100) such that, when the external power source 124 and/or the adapter 122 are recoupled to the external power source coupling 126, power may be supplied to the IHS 100 from the external power source 124 (i.e., the external power source 124 is enabled to supply power to the IHS 100.) In an embodiment, at block 410 of the method 400, a MOSFET in the power management circuit 200 may be turned on by the power source control circuit 210 in order to provide a DC power path to the external power source 124 and/or the adapter 122. In an embodiment, at block 410 of the method 400, charge voltage and current is read from the Electronically Erasable Programmable Read Only Memory (EEPROM) of the BMU. The method 400 then proceeds to block 412 where the method 400 sets a charge to a normal charge level. In an embodiment, the power management system 118 is operable to charge the battery 120 using a normal charge level which may be, for example, a normal charge current or a normal charge voltage. For example, a normal charge level may be a normal charge current that is used to charge the battery 120 when the battery storage option is the fully mobile battery storage option. One of skill in the art will recognize that a normal charge current is the typical charge current provided to charge conventional batteries in portable information handling systems, and may differ depending on the portable information handling system and the battery used. For conventional batteries in current portable information handling systems, a normal charge current may range between 2 and 3.6 amps. However, the normal charge current may vary without departing from the scope of the present disclosure, and the term 'normal charge level' is meant to be relative to a 'reduced charge level' that is provided in the method 400 to help extend the life of the battery 120, as will be described in further detail below. The method 400 may disable the external power source 124 from supplying power to the IHS 100 and reduce the charge provided to the battery 120 to a reduced charge level during the method 400, and the combination of decision block 408 and blocks 410 and 412 of the method 400 enable power to be supplied from the external power source 124 through the power supply system 116 to the IHS 100, and enable the charge provided to the battery 120 to be returned to a normal charge level in the event the external power source 124 and/or the adapter 122 are decoupled from the power management system 118 during the method 400. In other words, the decoupling of the external power source 124 from the power management system 118 during the method 400 returns the battery storage option from the desktop battery storage option to the fully mobile battery storage option.

If, at decision block 408, the method 400 determines that the external power source 124 is coupled to the power management system 118, the method 400 returns to decision block 402 to determine whether the battery power level in the battery 120 is greater than the second predetermined level. Thus, decision blocks 402 and 408 and blocks 404 and 406 result in power being supplied from the battery 120 to the IHS 100 as long as the battery power level in the battery 120 is above the second predetermined level, the battery is coupled to the power management system 118, and the external power source 124 is coupled to the power management system 118. In other words, if the battery power level in the battery 120 is above the second predetermined level, the method 400 will draw power from the battery 120 until the battery power level is below the second predetermined level.

If, at decision block 402, the method 400 determines that the battery power level in the battery 120 is not greater than the second predetermined level, the method 400 proceeds to block 414 where the external power source 124 is enabled to supply power to the IHS 100. In an embodiment, the external power source control circuit 210 is operable to enable the external power source 124 to supply power to the IHS 100. For example, if power is being supplied by the battery 120 to the IHS 100, at block 414 of the method 400 the power source control circuit 210 may enable a DC power path between the external power source 124 and the IHS 100 such that the external power source 124 provides power to the IHS 100 and the battery 120 no longer provides power to the IHS 100. In an embodiment, at block 414 of the method 400, a MOSFET in the power management circuit 200 may be turned on by the power source control circuit 210 in order to provide a DC power path to the external power source 124 and/or the adapter 122. The method 400 then proceeds to block 416 where the method 400 sets a charge for the battery 120 to a reduced charge level. In an embodiment, the power management system 118 is operable to charge the battery 120 using a reduced charge level which is less than a normal charge level that may include a normal charge current or a normal charge voltage, described above. For example, a normal charge level may be a normal charge current that is used to charge the battery 120 when the battery storage option is the fully mobile battery storage option, and the reduced charge level may be a reduced charge current that is less than the normal charge current. One of skill in the art will recognize that a normal charge current is the typical charge current provided to charge conventional batteries in portable information handling systems, and may differ depending on the portable information handling system and the battery involved. For conventional batteries in current portable information handling systems, a normal charge current may range between 2 and 3.6 amps. However, the normal charge current may vary without departing from the scope of the present disclosure, and the term 'normal charge level' is meant to be relative to the reduced charge level that the charge is set at in block 416 of the method 400. In an embodiment, the reduced charge current may be approximately 64 milliamps.

The method 400 then proceeds to decision block 418 where the method 400 determines whether the external power source 124 is coupled to the power management system 118. As described above, in an embodiment, the power supply detection and identification circuit 202 is operable to detect whether the external power source 124 is coupled to the power management system 118. If, at decision block 418, the method 400 determines that the external power source 124 is not coupled to the power management system 118 (e.g., the external power source 124 and/or adapter 122 have been decoupled from the external power source coupling 126 on the IHS 100), the method 400 proceeds to blocks 410 and 412 where the external power source 124 is enabled to supply power to the IHS 100 and the method 400 sets a charge for the battery 120 to a normal charge level, as described above. Thus, the combination of decision block 418 and blocks 410 and 412 of the method 400 enable power to be supplied from the external power source 124 through the power supply system 116 to the IHS 100, and enable the charge provided to the battery 120 to be returned to a normal charge level, in the event the external power source 124 and/or the adapter 122 are decoupled from the power management system 118 during the method 400. In other words, the decoupling of the external power source 124 from the power management system 118 during the method 400 returns the battery storage option from the desktop battery storage option to the fully mobile battery storage option.

If, at decision block 418, the method 400 determines that the external power source 124 is coupled to the power management system 118, the method 400 proceeds to decision block 420 where the method 400 determines whether the battery power level in the battery 120 is greater than a third predetermined level. In an embodiment, the controller 208 may be programmed to determine whether the battery power level in the battery 120 is greater than the third predetermined level. For example, at decision block 420, the controller 208 may determine whether the RSOC of the battery 120 is greater than 75% (i.e., the third predetermined level). If, at decision block 420, the method 400 determines that the battery power level in the battery 120 is not greater than the third predetermined level, the method 400 returns to decision block 418 to determine whether the external power source 124 is coupled to the power management system 118. If, at decision block 420, the method 400 determines that the battery power level in the battery 120 is greater than the third predetermined level, the method 400 returns to decision block 402 to determine whether the battery power level in the battery 120 is greater than the second predetermined level. Thus, decision blocks 418 and 420 result in power being supplied from the external power source 124 to the IHS 100 and the charge being supplied to the battery 120 at the reduced charge level as long as the battery power level in the battery 120 is below the third predetermined level and the external power source 408 is coupled to the power management system 118. In other words, the battery 120 will be charged at the reduced charge level until the battery power level in the battery 120 is greater than the third predetermined level.

In summary, the method 400 provides a desktop battery storage option that will disable power supply to the IHS 100 from the external power source 124 such that power is supplied to the IHS 100 from the battery 120 until the battery power level in the battery 120 is below a second predetermined level (e.g., 50% the RSOC of the battery 120). When the battery power level in the battery 120 drops below the second predetermined level, the method 400 will enable power supply to the IHS 100 from the external power source 124 such that the battery 120 is no longer supplying power to the IHS 100, and provide the battery 120 with a charge at a reduced charge level (e.g., 64 milliamps) until the battery power level in the battery 120 is above a third predetermined level (e.g., 75% the RSOC of the battery 120). The method 400 will continue discharging the battery 120 and then charging the battery 120 at a reduced charge level between the second predetermined level and the third predetermined level as long as the battery 120 and the external power source 124 are coupled to the power management system 118. In the event the battery 120 is decoupled from the power management system 118, the method 400 will enable power supply from the external power source 124 to the IHS 100 and reset the charge to be provided to the battery 120 to a normal charge level. In the event the external power source 124 is decoupled from the power management system 118, the method 400 will enable power to be supplied from the external power source 124 to the IHS 100 when the external power source 124 is recoupled to the power management system 118, and reset the charge to be provided to the battery 120 to a normal charge level.

Returning to FIG. 3, if at decision block 306 the method 300 determines that the user did not select the desktop battery storage option, the method 300 proceeds to decision block 308 where the method 300 determines whether the user selected the partially mobile battery storage option. If, at decision block 308, the method 300 determines that the user selected the partially mobile battery storage option, the method 300 proceeds to a method 500, illustrated in FIG. 5. In another embodiment, the method 300 may automatically proceed to the method 500 upon the battery power level in the battery 120 exceeding a predetermined level for a predetermined time. The method 500 begins at decision block 502 where the method 400 determines whether a battery power level in the battery 120 is greater than a fourth predetermined level. In an embodiment, the controller 208 may be programmed to determine whether the battery power level in the battery 120 is greater than the fourth predetermined level. For example, at decision block 502, the controller 208 may determine whether the RSOC of the battery 120 is greater than 80% (i.e., the fourth predetermined level).

If, at decision block 502, the method 500 determines that the battery power level in the battery 120 is greater than the fourth predetermined level, the method 500 proceeds to decision block 504 where the method 500 determines whether the battery 120 is coupled to the power management system 118. In an embodiment, the power supply detection and identification circuit 202 is operable to detect whether the battery 102 is coupled to the power management system 118. If, at decision block 504, the method 500 determines that the battery 120 is not coupled to the power management system 118, the method 500 proceeds to block 510 where the external power source 124 is enabled to supply power to the IHS 100. As will be described below, the method 500 may disable the external power source 124 from supplying power to the IHS 100 during the method 500, and the combination of decision block 504 and block 510 of the method 500 enable the external power source 124 to supply power through the power supply system 116 to the IHS 100 in the event the battery 120 is removed from the power supply system 116 during the method 500. In an embodiment, the power source control circuit 210 is operable to enable a DC power path from the external power source 124 and/or the adapter 122 such that power may be supplied to the IHS 100 from the external power source 124. In an embodiment, at block 510 of the method 500, a MOSFET in the power management circuit 200 may be turned on by the power source control circuit 210 in order to provide a DC power path between the IHS 100 and the external power source 124 and/or the adapter 122. In an embodiment, at block 510 of the method 500, charge voltage and current is read from the Electronically Erasable Programmable Read Only Memory (EEPROM) of the BMU. If, at decision block 504, the method 500 determines that the battery 120 is present in the power supply system 116, the method 500 proceeds to block 506 where the external power source 124 is disabled from supplying power to the IHS 100. In an embodiment, the power source control circuit 210 is operable to disable a DC power path from the external power source 124 and/or the adapter 122 such that power may not be supplied to the IHS 100 from the external power source 124, and power is then supplied to the IHS 100 from the battery 120. In an embodiment, a MOSFET in the power management circuit 200 may be turned off by the power source control circuit 210 to remove a DC power path between the IHS 100 and the external power source 124 and/or the adapter 122.

The method 500 then proceeds to decision block 508 where the method 500 determines whether the external power source 124 is coupled to the power management system 118. In an embodiment, the power supply detection and identification circuit 202 is operable to detect whether the external power source 124 is coupled to the power management system 118. If, at decision block 508, the method 500 determines that the external power source 124 is not coupled to the power management system 118 (e.g., the external power source 124 and/or adapter 122 have been decoupled from the external power source coupling 126 on the IHS 100), the method 500 proceeds to block 510 where the external power source 124 is enabled to supply power to the IHS 100. In an embodiment, the external power source control circuit 210 is operable to enable a DC power path (e.g., a DC power path between the external power source coupling 126 and one or more components of the IHS 100) such that, when the external power source 124 and/or the adapter 122 are recoupled to the external power source coupling 126, power may be supplied to the IHS 100 from the external power source 124 (i.e., the external power source 124 is enabled to supply power to the IHS 100.) In an embodiment, at block 510 of the method 500, a MOSFET in the power management circuit 200 may be turned on by the power source control circuit 210 in order to provide a DC power path between the IHS 100 and the external power source 124 and/or the adapter 122. In an embodiment, at block 510 of the method 500, charge voltage and current is read from the Electronically Erasable Programmable Read Only Memory (EEPROM) of the BMU. The method 500 then proceeds to block 512 where the method 500 sets a charge to a normal charge level. In an embodiment, the power management system 118 is operable to charge the battery 120 using a normal charge level which may be, for example, a normal charge current or a normal charge voltage. For example, a normal charge level may be a normal charge current that is used to charge the battery 120 when the battery storage option is the fully mobile battery storage option. One of skill in the art will recognize that a normal charge current is the typical charge current provided to charge conventional batteries in portable information handling systems, and may differ depending on the portable information handling system and the battery used. For conventional batteries in current portable information handling systems, a normal charge current may range between 2 and 3.6 amps. However, the normal charge current may vary without departing from the scope of the present disclosure, and the term 'normal charge level' is meant to be relative to a 'reduced charge level' that is provided in the method 500 to help extend the life of the battery 120, as will be described in further detail below. The method 500 may disable the external power source 124 from supplying power to the IHS 100 and reduce the charge provided to the battery 120 to a reduced charge level during the method 500, and the combination of decision block 508 and blocks 510 and 512 of the method 500 enable power to be supplied from the external power source 124 through the power supply system 116 to the IHS 100, and enable the charge provided to the battery 120 to be returned to a normal charge level in the event the external power source 124 and/or the adapter 122 are decoupled from the power management system 118 during the method 500. In other words, the decoupling of the external power source 124 from the power management system 118 during the method 500 returns the battery storage option from the partially mobile battery storage option to the fully mobile battery storage option.

If, at decision block 508, the method 500 determines that the external power source 124 is coupled to the power management system 118, the method 500 returns to decision block 502 to determine whether the battery power level in the battery 120 is greater than the fourth predetermined level. Thus, decision blocks 502 and 508 and blocks 504 and 506 result in the power being supplied from the battery 120 to the IHS 100 as long as the battery power level in the battery 120 is above the fourth predetermined level, the battery is coupled to the power management system 118, and the external power source 124 is coupled to the power management system 118. In other words, if the battery power level in the battery 120 is above the fourth predetermined level, the method 500 will draw power from the battery 120 until the battery power level is below the fourth predetermined level.

If, at decision block 502, the method 500 determines that the battery power level in the battery 120 is not greater than the fourth predetermined level, the method 500 proceeds to block 514 where the external power source 124 is enabled to supply power to the IHS 100. In an embodiment, the external power source control circuit 210 is operable to enable the external power source 124 to supply power to the IHS 100. For example, if power is being supplied by the battery 120 to the IHS 100, at block 514 of the method 500 the power source control circuit 210 may enable a DC power path between the external power source 124 and the IHS 100 such that the external power source 124 provides power to the IHS 100 and the battery 120 no longer provides power to the IHS 100. In an embodiment, at block 514 of the method 500, a MOSFET in the power management circuit 200 may be turned on by the power source control circuit 210 in order to provide a DC power path between the IHS 100 and the external power source 124 and/or the adapter 122. The method 500 then proceeds to block 516 where the method 500 sets a charge for the battery 120 to a reduced charge level. In an embodiment, the power management system 118 is operable to charge the battery 120 using a reduced charge level which is less than a normal charge level that may include a normal charge current or a normal charge voltage, described above. For example, a normal charge level may be a normal charge current that is used to charge the battery 120 when the battery storage option is the fully mobile battery storage option, and the reduced charge level may be a reduced charge current that is less than the normal charge current. One of skill in the art will recognize that a normal charge current is the typical charge current provided to charge conventional batteries in portable information handling systems, and may differ depending on the portable information handling system and the battery involved. For conventional batteries in current portable information handling systems, a normal charge current may range between 2 and 3.6 amps. However, the normal charge current may vary without departing from the scope of the present disclosure, and the term 'normal charge level' is meant to be relative to the reduced charge level that the charge is set at in block 416 of the method 500. In an embodiment, the reduced charge current may be approximately 64 milliamps.

The method 500 then proceeds to decision block 518 where the method 500 determines whether the external power source 124 is coupled to the power management system 118. As described above, in an embodiment, the power supply detection and identification circuit 202 is operable to detect whether the external power source 124 is coupled to the power management system 118. If, at decision block 518, the method 500 determines that the external power source 124 is not coupled to the power management system 118 (e.g., the external power source 124 and/or adapter 122 have been decoupled from the external power source coupling 126 on the IHS 100), the method 500 proceeds to blocks 510 and 512 where the external power source 124 is enabled to supply power to the IHS 100 and the method 500 sets a charge for the battery 120 to a normal charge level, as described above. Thus, the combination of decision block 518 and blocks 510 and 512 of the method 500 enable power to be supplied from the external power source 124 through the power supply system 116 to the IHS 100, and enable the charge provided to the battery 120 to be returned to a normal charge level, in the event the external power source 124 and/or the adapter 122 are decoupled from the power management system 118 during the method 500. In other words, the decoupling of the external power source 124 from the power management system 118 during the method 500 returns the battery storage option from the partially mobile battery storage option to the fully mobile battery storage option.

If, at decision block 518, the method 500 determines that the external power source 124 is coupled to the power management system 118, the method 500 proceeds to decision block 520 where the method 500 determines whether the battery power level in the battery 120 is greater than a fifth predetermined level. In an embodiment, the controller 208 may be programmed to determine whether the battery power level in the battery 120 is greater than the fifth predetermined level. For example, at decision block 520, the controller 208 may determine whether the RSOC of the battery 120 is greater than 95% (i.e., the fifth predetermined level). If, at decision block 520, the method 500 determines that the battery power level in the battery 120 is not greater than the fifth predetermined level, the method 500 returns to decision block 518 to determine whether the external power source 124 is coupled to the power management system 118. If, at decision block 520, the method 500 determines that the battery power level in the battery 120 is greater than the fifth predetermined level, the method 500 returns to decision block 502 to determine whether the battery power level in the battery 120 is greater than the fourth predetermined level. Thus, decision blocks 518 and 520 result in power being supplied from the external power source 124 to the IHS 100 and the charge being supplied to the battery 120 at the reduced charge level as long as the battery power level in the battery 120 is below the fifth predetermined level and the external power source 408 is coupled to the power management system 118. In other words, the battery 120 will be charged at the reduced charge level until the battery power level in the battery 120 is greater than the fifth predetermined level.

In summary, the method 500 provides a partially mobile battery storage option that will disable power supply to the IHS 100 from the external power source 124 such that power is supplied to the IHS 100 from the battery 120 until the battery power level in the battery 120 is below a fourth predetermined level (e.g., 80% the RSOC of the battery). When the battery power level in the battery 120 drops below the fourth predetermined level, the method 500 will enable power supply to the IHS 100 from the external power source 124 such that the battery 120 is no longer supplying power to the IHS 100, and provide the battery 120 with a charge at a reduced charge level (e.g., 64 milliamps) until the battery power level in the battery 120 is above a fifth predetermined level (e.g., 95% the RSOC of the battery 120). The method 500 will continue discharging the battery 120 and then charging the battery 120 at a reduced charge level between the fourth predetermined level and the fifth predetermined level as long as the battery 120 and the external power source 124 are coupled to the power management system 118. In the event the battery 120 is decoupled from the power management system 118, the method 500 will enable power supply from the external power source 124 to the IHS 100 and reset the charge to be provided to the battery 120 to a normal charge level. In the event the external power source 124 is decoupled from the power management system 118, the method 500 will enable power to be supplied from the external power source 124 to the IHS 100 when the external power source 124 is recoupled to the power management system 118, and reset the charge to be provided to the battery 120 to a normal charge level.

Returning to FIG. 3, if at decision block 308 the method 300 determines that the user did not select the partially mobile battery storage option, the method 300 proceeds to block 310 where the method 300 determines that the user selected a fully mobile battery storage option. In an embodiment, the fully mobile battery storage option is a convention battery storage option for a portable IHS in which the battery 120 is continually charged at a normal charge level, described above, and kept at a substantially full battery power level (e.g., 100% the RSOC of the battery 120). Subsequent to block 310 in the method 300, block 412 in the method 400, or block 512 in the method 500, the methods 300, 400, or 500 may proceed to block 312 of the method 300, where a timer is reset. In an embodiment, the timer may be part of or coupled to the controller 208 and may be operable to keep track of the predetermined time for decision block 302 of the method 300.

Thus, a battery life extending power supply system has been described that provides a plurality of battery storage options for extending the life of a battery. In experimental embodiments, it has been found that when a battery is kept at a substantially full battery power level and continually charged at a normal charge level for extended periods of time, while only being discharged occasionally, the cycle life of that battery is reduced relative to batteries that are discharged more regularly. Furthermore, it has been found that the cycle life of such batteries that are only discharged occasionally can be improved with the battery life extending power supply system described above. The battery life extending power supply system allows users that seldom discharge their batteries to select a desktop or partially mobile battery storage option to extend the life of their battery. In an embodiment, the desktop battery storage option will keep the battery power level of the battery in a predetermined battery power level range (e.g., between 50-75% of the RSOC of the battery) while charging the battery at a reduced charge level (e.g., 64 milliamps). In an embodiment, the partially mobile battery storage option will keep the battery power level of the battery in a predetermined battery power level range (e.g., between 80-95% of the RSOC of the battery) while charging the battery at a reduced charge level (e.g., 64 milliamps). Such battery storage options have been found to more than double the battery watt-hours for a given battery cycle count, and increase the battery cycle count by over 50% for a given battery watt-hours. Furthermore, the battery life extending power supply system provides safeguards for transferring power supply between an external power source and the battery so that the system always provides power, while also providing for the automatic resetting of the battery storage option to a fully mobile battery storage option.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power supply system, comprising:
a system load;
a battery; and
a power management system that is coupled to the battery and the system load, wherein the power management system is operable to couple to an external power source that is operable to provide power for powering the system load and charging the battery at a first charge level, wherein the power management system is further operable, when coupled to the external power source, to:
determine that a battery power level of the battery is greater than a first predetermined level that depends on a battery storage option and, in response, disable power from being supplied from the external power source such that power is supplied from the battery to the system load until the battery power level is below the first predetermined level; and
determine that the battery power level of the battery is less than the first predetermined level and, in response, use the external power source to power the system load while charging the battery at a second charge level that is less than the first charge level until the battery power level is above a second predetermined level that depends on the battery storage option.

2. The system of claim 1, wherein the power management system is further operable, when coupled to the external power source, to:
determine that the battery has been decoupled from the power management system and, in response, enable the supply of power from the external power source to power the system load.

3. The system of claim 1, wherein the power management system further comprises an external power source coupling, and wherein the power management system is further operable, when coupled to the external power source through the external power source coupling, to:
determine that the external power source has been decoupled from the external power source coupling and, in response, enable the supply of power through the external power source coupling such that power may be supplied from the external power source to the system load when the external power source is recoupled to the external power source coupling.

4. The system of claim 3, wherein the power management system is further operable to:
determine that the external power source has been recoupled to the external power source coupling and, in response, use the external power source to power the system load while charging the battery at the first charge level.

5. The system of claim 1, further comprising:
an adapter that is operable to couple the external power source to the power management system.

6. The system of claim 1, wherein the power management system comprises:
a power supply detection and identification circuit that is coupled to the battery and that is operable to couple to the external power source;
a power source control circuit that is coupled to the battery and that is operable to couple to the external power source and; and
a controller that is coupled to the power source control circuit.

7. A power supply system, comprising:
a battery; and
a power management system that is coupled to the battery and that is operable to couple to an external power source that is operable to charqe the battery using a first charge level, wherein the power management system is operable to:
determine that a battery power level of the battery has exceeded a first predetermined power level for a predetermined time and, in response, prompt a user to select a battery storage option;

determine that the battery power level of the battery is greater than a second predetermined level that depends on the battery storage option and, in response, disable power from being supplied from the external power source such that power is supplied from the battery until the battery power level is below the second predetermined level; and determine that the battery power level of the battery is less than the second predetermined level and, in response, charge the battery with a second charge level that is less than the first charge level until the battery power level is above a third predetermined level that depends on the battery storage option.

8. An information handling system, comprising:

a processor;

a memory coupled to the processor; and a power supply system that is coupled to the processor and the memory such that the power supply system is operable to supply power to the processor and the memory, wherein the power supply system comprises:

a battery; and a power management system that is coupled to the battery, the processor, and the memory, and wherein the power management system is operable to couple to an external power source that is operable to provide power for powering the processor and the memory and charging the battery at a first charge level, wherein the power management system is operable to:

determine that a battery power level of the battery is greater than a first predetermined level that depends on a battery storage option and, in response, disable power from being supplied from the external power source such that power is supplied from the battery to the processor and the memory until the battery power level is below the first predetermined level; and determine that the battery power level of the battery is less than the first predetermined level and, in response, use the external power source to power the processor and the memory while charging the battery at a second charge level that is less than the first charge level until the battery power level is above a second predetermined level that depends on the battery storage option.

9. The system of claim 8, wherein the power management system is further operable, when coupled to the external power source, to:

determine that the battery has been decoupled from the power management system and, in response, enable the supply of power from the external power source to power the processor and the memory.

10. The system of claim 8, wherein the power management system further comprises an external power source coupling, and wherein the power management system is further operable, when coupled to the external power source through the external power source coupling, to:

determine that the external power source has been decoupled from the external power source coupling and, in response, enable the supply of power through the external power source coupling such that power may be supplied from the external power source to the processor and the memory when the external power source is recoupled to the external power source coupling.

11. The system of claim 10, wherein the power management system is further operable to:

determine that the external power source has been recoupled to the external power source coupling and, in response, use the external power source to power the processor and the memory while charging the battery at the first charge level.

12. The system of claim 8, further comprising:

an adapter that is operable to couple the external power source to the power management system.

13. The system of claim 8, wherein the power management system comprises:

a power supply detection and identification circuit that is coupled to the battery and that is operable to couple to the external power source;

a power source control circuit that is coupled to the battery and that is operable to couple to the external power source; and a controller that is coupled to the power source control circuit.

14. An information handling system, comprising:

a processor;

a memory coupled to the processor; and a power supply system that is coupled to the processor and the memory such that the power supply system is operable to supply power to the processor and the memory, wherein the power supply system comprises:

a battery; and a power management system that is coupled to the battery and that is operable to couple to an external power source that is operable to charge the battery using a first charge level, wherein the power management system is operable to:

determine that a battery power level of the battery has exceeded a first predetermined power level for a predetermined time and, in response, prompt a user to select a battery storage option;

determine that the battery power level of the battery is greater than a second predetermined level that depends on the battery storage option and, in response, disable power from being supplied from the external power source such that power is supplied from the battery until the battery power level is below the second predetermined level; and determine that the battery power level of the battery is less than the second predetermined level and, in response, charge the battery with a second charge level that is less than the first charge level until the battery power level is above a third predetermined level that depends on the battery storage option.

15. A method for managing power, comprising:

providing a power management system coupled to each of a battery and a system load;

coupling the power management system to an external power source that is operable to power the system load and charge the battery at a first charge level;

determining that a battery power level of the battery is greater than a first predetermined level that depends on a battery storage option and, in response, disabling power from being supplied from the external power source such that power is supplied from the battery to the system load until the battery power level is below the first predetermined level; and determining that the battery power level of the battery is less than the first predetermined level and, in response, using the external power source to power the system load while charging the battery at a second charge level that is less than the first charge level until the battery power level is above a second predetermined level that depends on the battery storage option.

16. The method of claim 15, further comprising:
determining that the battery has been decoupled from the power management system and, in response, enabling the supply of power from the external power source to power the system load.

17. The method of claim 15, further comprising:
determining that the external power source has been decoupled from an external power source coupling that is coupled to the power management system and, in response, enabling the supply of power through the external power source coupling such that power may be supplied from the external power source to the system load when the external power source is recoupled to the external power source coupling.

18. The method of claim 17, further comprising:
determining that the external power source has been recoupled to the external power source coupling and, in response, using the external power source to power the system load while charging the battery at the first charge level.

19. The method of claim 15, wherein the power management system is coupled to the external power source through an adapter.

20. A method for managing power, comprising:
providing a power management system coupled to each of a battery and an external power source that is operable to charge the battery using a first charge level;
determining that a battery power level of the battery has exceeded a first predetermined level for a predetermined time and, in response, prompting a user to select a battery storage option;
determining that the battery power level of the battery is greater than a second predetermined level that depends on the battery storage option and, in response, disabling power from being supplied from the external power source such that power is supplied from the battery until the battery power level is below the second predetermined level; and
determining that the battery power level of the battery is less than the second predetermined level and, in response, charging the battery with a second charge level that is less than the first charge level until the battery power level is above a third predetermined level that depends on the battery storage option.

* * * * *